(12) United States Patent
Wu et al.

(10) Patent No.: US 11,025,841 B2
(45) Date of Patent: Jun. 1, 2021

(54) METHOD FOR DESIGNING A FREEFORM SURFACE REFLECTIVE IMAGING SYSTEM

(71) Applicants: Tsinghua University, Beijing (CN); HON HAI PRECISION INDUSTRY CO., LTD., New Taipei (TW)

(72) Inventors: Wei-Chen Wu, Beijing (CN); Jun Zhu, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/910,370

(22) Filed: Jun. 24, 2020

(65) Prior Publication Data

US 2021/0037199 A1    Feb. 4, 2021

(30) Foreign Application Priority Data

Aug. 1, 2019    (CN) .......................... 201910709139.6

(51) Int. Cl.
*H04N 5/341*    (2011.01)
*G02B 27/09*    (2006.01)
*G02B 27/00*    (2006.01)

(52) U.S. Cl.
CPC ....... *H04N 5/3415* (2013.01); *G02B 27/0977* (2013.01); *G02B 27/0025* (2013.01)

(58) Field of Classification Search
CPC .................................................... H04N 5/3415
USPC ........................................................ 348/294
See application file for complete search history.

(56) References Cited

U.S. PATENT DOCUMENTS 9,524,565 B2 * 12/2016 Zhu ..................... G02B 27/0012

* cited by examiner

*Primary Examiner* — Joel W Fosselman
(74) *Attorney, Agent, or Firm* — ScienBiziP, P.C.

(57) ABSTRACT

The present invention relates to a method for designing a freeform surface reflective imaging system, comprising: selecting an initial system, wherein an FOV of the initial system is $X_0 \times Y_0$; selecting an FOV sequence as $[X_0, Y_0]$, $[X_1, Y_1]$, $[X_2, Y_2]$, . . . , $[X_n, Y_n]$, while the FOV of the system to be designed is $X_n \times Y_n$, and $X_0 < X_1 < X_2 < \ldots < X_n$, $Y_0 < Y_1 < Y_2 < \ldots < Y_n$; using point-by-point methods to construct all freeform surfaces of the initial system in the FOV of $X_1 \times Y_1$; setting the system obtained in the last step as a second initial system for system construction in the FOV of $X_2 \times Y_2$; repeating the last step to execute system construction in the order of the FOV sequence until the final FOV $X_n \times Y_n$ is obtained.

13 Claims, 7 Drawing Sheets

METHOD FOR DESIGNING A FREEFORM SURFACE REFLECTIVE IMAGING SYSTEM

CROSS-REFERENCE TO RELATED APPLICATIONS

This application claims all benefits accruing under 35 U.S.C. § 119 from China Patent Application No. 201910709139.6, filed on Aug. 1, 2019, in the China National Intellectual Property Administration, the contents of which are hereby incorporated by reference. This application is related to application Ser. No. 16/916,016 entitled, "FREEFORM SURFACE REFLECTIVE INFRARED IMAGING SYSTEM", filed Jun. 29, 2020.

FIELD

The present disclosure relates to a method for designing a freeform surface reflective imaging system.

BACKGROUND

Compared with conventional rotationally symmetric surfaces, freeform surfaces have asymmetric surfaces and more degrees of design freedom, which can reduce the aberrations and simplify the structure of the system. In recent years, freeform surfaces are often used in off-axial three-mirror imaging systems.

Free-form off-axis imaging systems are generally obtained using direct design methods, such as differential equation method, multi-surface synchronous design method, and point-by-point construction and iterative methods. However, the above design methods can only consider a limited number of field of views (FOA), failing to achieve a low F-number and a wide rectangular FOA simultaneously.

What is needed, therefore, is to provide a method for designing a freeform surface imaging system, to solve the problems discussed above.

BRIEF DESCRIPTION OF THE DRAWINGS

Many aspects of the exemplary embodiments can be better understood with reference to the following drawings. The components in the drawings are not necessarily drawn to scale, the emphasis instead being placed upon clearly illustrating the principles of the exemplary embodiments. Moreover, in the drawings, like reference numerals designate corresponding parts throughout the several views.

DETAILED DESCRIPTION

Figure 1:
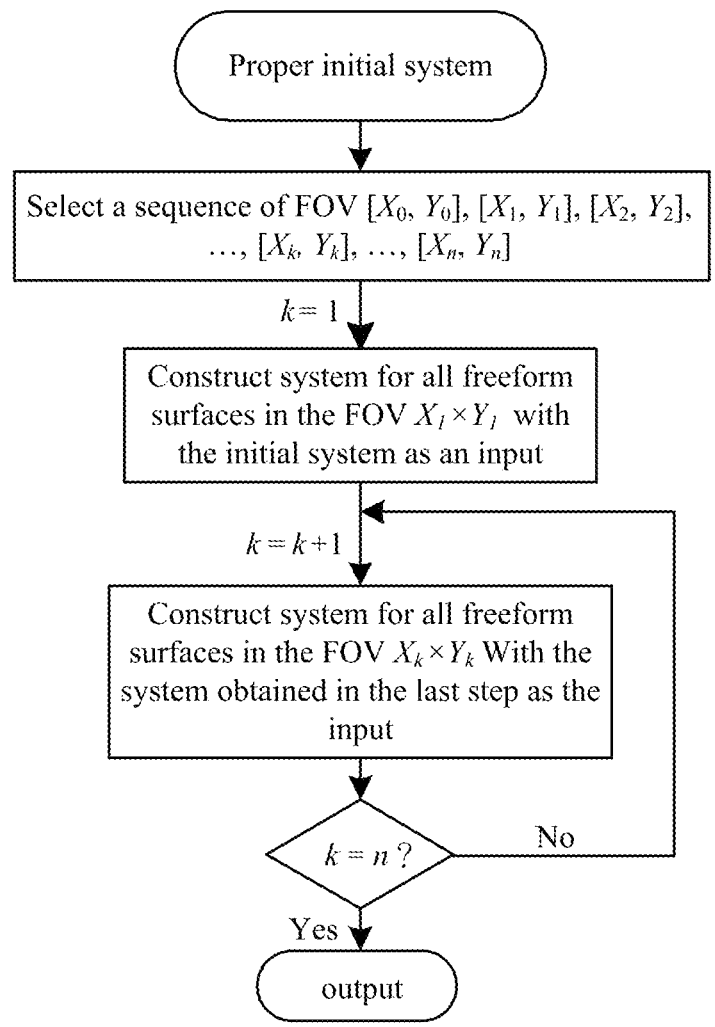
FIG. 1 shows a flow diagram of a method for designing a freeform surface reflective imaging system in one embodiment.

The disclosure is illustrated by way of embodiments and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to illustrate details and features of the present disclosure better.

Several definitions that apply throughout this disclosure will now be presented.

The term "substantially" is defined to be essentially conforming to the particular dimension, shape, or other feature which is described, such that the component need not be exactly or strictly conforming to such a feature. The term "include," when utilized, means "include, but not necessarily limited to"; it specifically indicates open-ended inclusion or membership in the so-described combination, group, series, and the like.

Referring to FIG. 1, a method for designing a freeform surface reflective imaging system comprises the following steps:

Step (S1), selecting an existing imaging system with a low F-number, a small rectangular FOV and sufficient space for expansion as an initial system, wherein the FOV of the initial system is $X_0 \times Y_0$;

step (S2), selecting an appropriate sequence of the FOV as $[X_0, Y_0], [X_1, Y_1], [X_2, Y_2], \ldots, [X_n, Y_n]$, while the FOV of the system to be designed is $X_n \times Y_n$, and $X_0 < X_1 < X_2 < \ldots < X_n$, $Y_0 < Y_1 < Y_2 < \ldots < Y_n$;

step (S3), using point-by-point methods to construct all freeform surfaces of the initial system in the FOV of $X_1 \times Y_1$;

step (S4), setting the system obtained in the last step as a new initial system for system construction in the FOV of $X_2 \times Y_2$;

step (S5), repeating the step (S4) to execute system construction in the order of the FOV sequence until the final FOV $X_n \times Y_n$ is obtained.

Steps (S1) to (S5) are described in detail as follows.

Figure 2:
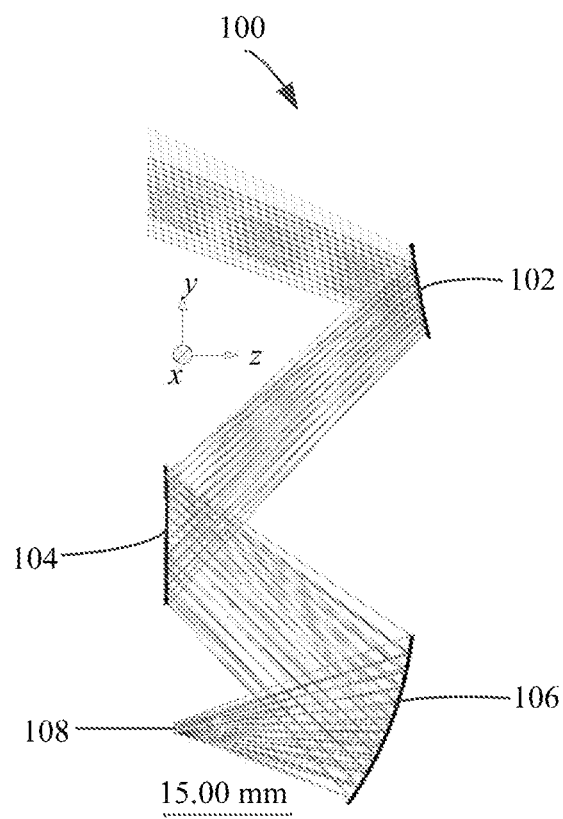
FIG. 2 shows a schematic structural diagram of an initial system in one embodiment.

In the step (S1), the initial system comprises L initial surfaces, and the L initial surfaces are defined as $L_j$ (j=1, 2, ... L). Each of the plurality of initial surfaces corresponds to one freeform surface of the freeform surface reflective imaging system. The plurality of initial surfaces are freeform surfaces. Locations of the plurality of initial surfaces can be selected according to actual needs of the freeform surface reflective imaging system. The number of the plurality of initial surfaces can be selected according to the actual needs. Referring to FIG. 2, in one embodiment, the initial system is an initial freeform surface off-axis three-mirror imaging system 100. The initial freeform surface off-axis three-mirror imaging system 100 comprises an initial primary mirror 102, an initial secondary mirror 104, an initial tertiary mirror 106 and an infrared light detector 108. Each of the initial primary mirror 102, the initial secondary mirror 104, the initial tertiary mirror 106 comprises an initial freeform surface. The initial secondary mirror 104 is an aperture. The F-number of the initial system is 1.39. The offset FOV of the initial system is 8°×6°. A center of the FOV is (0,−22°). The focal length of the initial system is scaled to 9.3 mm.

In the step (S2), the method requires system construction to be performed several times and it is assumed that there is a total of n construction steps. The final FOV of the system is defined as $X_n \times Y_n$. The FOV sequence is selected as $[X_0, Y_0], [X_1, Y_1], [X_2, Y_2], \ldots, [X_n, Y_n]$, defined as the initial FOV, the first FOV the second FOV, . . . , and the nth FOV. In one embodiment, the FOV sequence can be selected using an equal step length, that is, the differences between adjacent values in $X_0, X_1, X_2, \ldots, X_n$ are equal, and the differences between adjacent values in $Y_0, Y_1, Y_2, \ldots, Y_n$ are equal. In another embodiment, the FOV sequence can be selected using a large step length during the first few constructions and a small step length when approaching the final FOV. When the FOV is small, a stability of the system during construction is high. A large step length can reduce system construction time and save computation time. When the FOV under construction approaches the final FOV, a small step length can increase an instability of the system caused by the ultrahigh performance.

In one embodiment, the final FOV is set as 40°×30°. The FOV sequence of [8°, 6°], [16°, 12°], [20°, 15°], [24°, 18°], [28°, 21°], [32°, 24°], [34°, 25.5°], [36°, 27°], [38°, 28.5°] and [40°, 30°] is selected.

In the step (S3), according to the first FOV $X_1 \times Y_1$, the initial freeform surface $L_j$ (j=i=1, 2 . . . L) is constructed sequentially into freeform surface $N_j$ (j=i=1, 2 . . . L) using the point-by-point method. An order of constructing the freeform surface $N_j$ is not limited, and can be exchanged according to actual needs. The present disclosure takes the construction of freeform surface $N_1$ as an example to explain the construction of freeform surfaces in detail. The method for constructing the initial freeform surface $L_1$ into the freeform surface $N_1$ comprises the following steps:

Step S31, selecting K feature rays $R_i$ (i=1, 2 . . . K);

Step S32, obtaining a plurality of intersection points of the K feature rays and the freeform surface $N_1$ based on the object-image relationships and the law of reflections, and calculating a plurality of feature data points $P_i$ (i=1, 2 . . . K) on the freeform surface $N_1$; and Step S33, surface fitting the plurality of feature data points to obtain an equation of the freeform surface N1.

In the step S31, a method of selecting K feature rays can comprise steps of: selecting M feature fields within the FOV of $X_1 \times Y_1$; selecting K feature rays in the M feature fields.

The method for selecting the M feature fields is not limited. There are many ways to select these feature fields. An off-axis reflective imaging system is often symmetrical about the yOz plane. If the FOV is offset, then in the case of $(0, y_0)$ as the center of the FOV, the feature fields can be selected in the following manner:

$$\left\{(0, y_0)\left(0, y_0 + \frac{Y_1}{2}\right)\left(0, y_0 - \frac{Y_1}{2}\right)\left(\frac{X_1}{2}, y_0\right)\left(\frac{X_1}{2}, y_0 + \frac{Y_1}{2}\right)\left(\frac{X_1}{2}, y_0 - \frac{Y_1}{2}\right)\right\}.$$

In one embodiment, the center of the FOV is (0,−22°). Therefore, six feature fields are selected in the first FOV 16°×12° and the six feature fields are (0,−22°), (0,−16°), (0,−28°), (8,−22°), (8,−16°), (8,−28°) respectively.

A method of selecting the K feature rays comprises steps of: an aperture of each of the M feature fields is divided into N equal parts; and, P feature rays at different aperture positions in each of the N equal parts are selected. As such, K=M×N×P different feature rays correspond to different aperture positions and different fields are selected. The aperture can be circle, rectangle, square, oval or other shapes. In one embodiment, the aperture of each of the M feature fields is a circle, and a circular aperture of each of the M fields is divided into N angles with equal interval φ, as such, N=2π/φ; then, P different aperture positions are fixed along a radial direction of each of the N angles. Therefore, K=M×N×P different feature rays correspond to different aperture positions and different fields are selected. In one embodiment, the aperture of each field is divided into 14 equal parts; and, 7 feature rays at different aperture positions in each of the 14 equal parts are selected. As such, 98 different feature rays are selected in each field and a total of 588 feature rays are selected in the 6 feature fields.

In the step S32, a surface Ω is defined as the freeform surface $N_1$, a surface Ω' is defined as a surface located adjacent to and before the surface Ω, and a surface Ω" is defined as a surface located adjacent to and after the surface Ω. The intersections of the plurality of feature rays $R_i$ (i=1, 2 . . . K) with the surface Ω are defined as the first feature data points $P_i$ (i=1, 2 . . . K). The plurality of feature rays $R_i$ (i=1, 2 . . . K) are intersected with the surface Ω' at a plurality of start points $S_i$ (i=1, 2 . . . K), and intersected with the surface Ω" at a plurality of end points $E_i$ (i=1, 2 . . . K). When the surface Ω and the plurality of feature rays $R_i$ (i=1, 2 . . . K) are determined, the plurality of start points $S_i$ (i=1, 2 . . . K) of the feature rays $R_i$ (i=1, 2 . . . K) can also be determined. The plurality of end points $E_i$ (i=1, 2 . . . K) can also be obtained based on the object-image relationship or given mapping relationship. Under ideal conditions, the feature rays $R_i$ (i=1, 2 . . . K) emitted from the plurality of start points $S_i$ (i=1, 2 . . . K) on the surface Ω'; pass through the first feature data points $P_i$ (i=1, 2 . . . K) on the surface Ω; intersect with the surface Ω" at the plurality of end points $E_i$ (i=1, 2 . . . K); and finally intersect with the image plane at the plurality of ideal target points $T_{i,ideal}$ (i=1, 2 . . . K). If the surface Ω" is the target plane, the plurality of end points $E_i$ (i=1, 2 . . . K) are the plurality of ideal target points $I_i$ (i=1, 2 . . . K). If there are other surfaces between the surface Ω and the target plane, the plurality of end points $E_i$ (i=1, 2 . . . K) are the points on the surface Ω", which make the first variation of the optical path length between the first feature data points $P_i$ (i=1, 2 . . . K) and their corresponding target points zero. $\delta S = \delta \int_{P_i}^{T_i} nds = 0$, wherein ds is the differential elements of the optical path length along the plurality of feature rays $R_i$ (i=1, 2 . . . K), n denotes the refractive index of the medium, and δ denotes a differential variation.

The plurality of first feature data points $P_i$ (i=1, 2 . . . K) can be obtained by the following two calculating methods.

A first calculating method comprises the following substeps:

step (a): defining a first intersection of a first feature ray $R_1$ and the freeform surface $N_1$ as a feature data point $P_1$;

step (b): when i (1≤i≤K−1) first feature data points $P_i$ (1≤i≤K−1) have been obtained, a unit normal vector $\vec{N}_i$ (1≤i≤K−1) at each of the i (1≤i≤K−1) first feature data points $P_i$ (1≤i≤K−1) can be calculated based on a vector form of Snell's Law;

step (c): making a first tangent plane at the i (1≤i≤K−1) first feature data points $P_i$ (1≤i≤K−1) respectively; thus i first tangent planes can be obtained, and i×(K−i) second intersections can be obtained by the i first tangent planes intersecting with remaining (K−i) feature rays; and a second intersection, which is nearest to the i (1≤i≤K−1) first feature data points $P_i$, is fixed from the i×(K−i) second intersections as a next feature data point $P_{i+1}$ (1≤i≤K−1); and step (d): repeating steps (b) and (c), until all the plurality of first feature data points $P_i$ (i=1, 2 ... K) are calculated.

In step (b), the unit normal vector $\vec{N}_i$ (1≤i≤K−1) at each of the feature data point $P_i$ (1≤i≤K−1) can be calculated based on the vector form of Snell's Law. When the first freeform surface is a refractive surface, $$\vec{N}_i = \frac{n'\vec{r}'_i - n\vec{r}_i}{|n'\vec{r}'_i - n\vec{r}_i|}, \quad (1)$$

Wherein, $$\vec{r}_i = \frac{\overrightarrow{P_i S_i}}{|\overrightarrow{P_i S_i}|}$$

is a unit vector along a direction of an incident ray for the first freeform surface;

$$\vec{r}'_i = \frac{\overrightarrow{E_i P_i}}{|\overrightarrow{E_i P_i}|}$$

is a unit vector along a direction for an exit ray of the first freeform surface; and n, n' is the refractive index of a media before and after the first freeform surface respectively.

Similarly, when the first freeform surface is a reflective surface, $$\vec{N}_i = \frac{\vec{r}'_i - \vec{r}_i}{|\vec{r}'_i - \vec{r}_i|}. \quad (2)$$

The unit normal vector $\vec{N}_i$ at each of the plurality of first feature data points $P_i$ (i=1, 2 ... K) is perpendicular to the first tangent plane at each of the plurality of first feature data points $P_i$ (i=1, 2 ... K). Thus, the first tangent plane at each of the plurality of first feature data points $P_i$ (i=1, 2 ... K) can be obtained.

The first calculating method comprises a computational complexity formula of $$T(K) = \sum_{i=1}^{K-1} i(K-i) = \frac{1}{6}K^3 - \frac{1}{6}K = O(K^3).$$

When a large quantity of feature rays are used in a design, the first calculating method requires a long computation time.

A second calculating method comprises the following sub-steps:

step (a'): defining a first intersection of a first feature light ray $R_1$ and the initial surface as a feature data point $P_1$;

step (b'): when an ith (1≤i≤K−1) feature data point $P_i$ (1≤i≤K−1) has been obtained, a unit normal vector $\vec{N}_i$ at the ith (1≤i≤K−1) feature data point $P_i$ (1≤i≤K−1) can be calculated based on the vector form of Snell's law;

step (c'): making a first tangent plane through the ith (1≤i≤K−1) feature data point $P_i$ (1≤i≤K−1), and (K−i) second intersections can be obtained by the first tangent plane intersecting with remaining (K−i) feature rays: a second intersection $Q_{i+1}$, which is nearest to the ith (1≤i≤K−1) feature data point $P_i$ (1≤i≤K−1), is fixed; and a feature ray corresponding to the second intersection $Q_{i+1}$ is defined as $R_{i+1}$, a shortest distance between the second intersection $Q_{i+1}$ and the ith feature data point $P_i$ (1≤i≤K−1) is defined as $d_i$;

step (d'): making a second tangent plane at (i−1) feature data points that are obtained before the ith feature data point $P_i$ (1≤i≤K−1) respectively; thus, (i−1) second tangent planes can be obtained, and (i−1) third intersections can be obtained by the (i−1) second tangent planes intersecting with a feature ray $R_{i+1}$; in each of the (i−1) second tangent planes, each of the (i−1) third intersections and its corresponding feature data point form an intersection pair; the intersection pair, which has the shortest distance between a third intersection and its corresponding feature data point, is fixed; and the third intersection and the shortest distance is defined as $Q'_{i+1}$ and $d'_i$ respectively;

step (e'): comparing $d_i$ and $d'_i$, if $d_i \leq d'_i$, $Q_{i+1}$ is taken as the next feature data point $P_{i+1}$ (1≤i≤K−1); otherwise, $Q'_{i+1}$ is taken as the next feature data point $P_{i+1}$ (1≤i≤K−1); and step (f'): repeating steps from (b') to (e'), until the plurality of feature data points $P_i$ (i=1, 2 ... K) are all calculated.

In step (b'), a calculating method of the unit normal vector $\vec{N}_i$ at the ith (1≤i≤K−1) feature data point $P_i$ (1≤i≤K−1) is the same as the first calculating method.

A second calculating method comprises a computational complexity formula of $$T(K) = \sum_{i=1}^{K-1} K - i + i - 1 = (K-i)^2 = O(K^2).$$

When a large quantity of feature rays are used in a design, the computational complexity of the second calculating method is much smaller than the computational complexity of the first calculating method.

In the step S33, a method of surface fitting the plurality of first feature data points $P_i$ (i=1, 2 ... K) comprises:

step (3311): surface fitting the plurality of first feature data points $P_i$ (i=1, 2 ... K) to a sphere in the first three-dimensional rectangular coordinates system, and obtaining a curvature c of the sphere and the center of curvature $(x_c, y_c, z_c)$ corresponding to the curvature c of the sphere;

step (S332): defining the feature data point $(x_o, y_o, z_o)$ corresponding to a chief ray of the central field angle among the entire field-of-view (FOV) as the vertex of the sphere, defining a second three-dimensional rectangular coordinates system by the vertex of the sphere as an origin and a line passing through the center of curvature and the vertex of the sphere as a Z'-axis;

step (S333): transforming the coordinates $(x_i, y_i, z_i)$ and the normal vector $(\alpha_i, \beta_i, \gamma_i)$, of the plurality of first feature data points $P_i$ (i=1, 2 ... K) in the first three-dimensional rectangular coordinates system, into the coordinates $(x'_i, y'_i, z'_i)$ and the normal vector $(\alpha'_i, \beta'_i, \gamma'_i)$, of the plurality of first feature data points $P_i$ (i=1, 2 ... K) in the second three-dimensional rectangular coordinates system;

step (S334): fitting the plurality of first feature data points $P_i$ (i=1, 2 ... K) into a conic surface equation of a conic surface in the second three-dimensional rectangular coordinates system, based on the coordinates $(x'_i, y'_i, z'_i)$ and the curvature c of the sphere, and obtaining the conic constant k; and step (S335): removing the coordinates and the normal vector of the plurality of first feature data points $P_i$ (i=1, 2 ... K), on the conic surface in the second three-dimensional rectangular coordinates system, from the coordinates $(x'_i, y'_i, z'_i)$ and the normal vector $(\alpha'_i, \beta'_i, \gamma'_i)$, to obtain a residual coordinate and a residual normal vector; and fitting the residual coordinate and the residual normal vector to obtain a polynomial surface equation; the equation of the first freeform surface can be obtained by adding the conic surface equation and the polynomial surface equation.

Generally, the optical systems are symmetric about the yOz plane. Therefore, the tilt angle θ of the sphere in the y'O'z' plane of the second three-dimensional rectangular coordinates system relative to the sphere in the yOz plane of the first three-dimensional rectangular coordinates system, is:

$$\theta = \arctan\left(\frac{y_o - y_c}{z_o - z_c}\right).$$

The relationship between the coordinates $(x'_i, y'_i, z'_i)$ and the coordinates $(x_i, y_i, z_i)$ of each of the plurality of first feature data points $P_i$ (i=1, 2 ... K) can be expressed as follows:

$$\begin{cases} x'_i = x_i - x_o \\ y'_i = (y_i - y_o)\cos\theta - (z_i - z_o)\sin\theta \\ z'_i = (y_i - y_o)\sin\theta + (z_i - z_o)\cos\theta \end{cases}$$

The relationship between the normal vector $(\alpha'_i, \beta'_i, \gamma'_i)$ and the normal vector $(\alpha_i, \beta_i, \gamma_i)$ of each of the plurality of first feature data points $P_i$ (i=1, 2 ... K) can be expressed as follows:

$$\begin{cases} \alpha'_i = \alpha_i \\ \beta'_i = \beta_i \cos\theta - \gamma_i \sin\theta \\ \gamma'_i = \beta_i \sin\theta + \gamma_i \cos\theta \end{cases}$$

In the second three-dimensional rectangular coordinates system, the coordinates and the normal vector of the plurality of first feature data points $P_i$ (i=1, 2 ... K) on the conic surface are defined as $(x'_i, y'_i, z'_i)$ and $(\alpha'_{is}, \beta'_{is}, \gamma'_{is})$ respectively. The Z'-axis component of the normal vector is normalized to −1. The residual coordinate $(x''_i, y''_i, z''_i)$ and the residual normal vector $(\alpha''_i, \beta''_i, -1)$ can be obtained, wherein, $(x''_i, y''_i, z''_i) = (x'_i, y'_i, z'_i - z'_{is})$ and $$(\alpha''_i, \beta''_i, -1) = \left(-\frac{\alpha'_i}{\gamma'_i} + \frac{\alpha'_{is}}{\gamma'_{is}}, -\frac{\beta'_i}{\gamma'_i} + \frac{\beta'_{is}}{\gamma'_{is}}, -1\right).$$

In step S335, a method of surface fitting the residual coordinate and the residual normal vector comprises:

step (S3351): in the second three-dimensional rectangular coordinates system, expressing a polynomial surface by the polynomial surface equation leaving out the conic surface term, the polynomial surface can be expressed in terms of the following equation:

$$z = f(x, y; P) = \sum_{j=1}^{J} P_j g_j(x, y),$$

wherein $g_j(x, y)$ is one item of the polynomial, and $P = (p_1, p_2, \ldots, p_J)^T$ is the coefficient sets;

step (S3352): acquiring a first sum of squares $d_1(P)$, of residual coordinate differences in z' direction between the residual coordinate value $(x''_i, y''_i, z''_i)$ (i=1, 2, ..., K) and the freeform surface; and a second sum of squares $d_2(P)$, of modulus of vector differences between the residual normal vector $N_i = (\alpha''_i, \beta''_i, -1)$ (i=1, 2, ..., K) and a normal vector of the freeform surface, wherein the first sum of squares $d_1(P)$ is expressed in terms of a first equation:

$$d_1(P) = \sum_{i=1}^{I} [z_i - f(x''_i, y''_i; P)]^2 = (Z - A_1 P)^T (Z - A_1 P),$$

the second sum of squares $d_2(P)$ is expressed in terms of a second equation:

$$d_2(P) = \sum_{i=1}^{I} \{[u_i - f_{x''}(x''_i, y''_i; P)]^2 + [v_i - f_{y''}(x''_i, y''_i; P)]^2\} =$$
$$(U - A_2 P)^T (U - A_2 P) + (V - A_3 P)^T (V - A_3 P)$$

wherein, $Z = (z_1, z_2, \ldots, z_I)$, $U = (u_1, u_2, \ldots, u_I)$, $V = (v_1, v_2, \ldots, v_I)^T$, $$A_1 = \begin{pmatrix} g_1(x''_1, y''_1) & g_2(x''_1, y''_1) & \cdots & g_J(x''_1, y''_1) \\ g_1(x''_2, y''_2) & g_2(x''_2, y''_2) & \cdots & g_J(x''_2, y''_2) \\ \vdots & \vdots & & \vdots \\ g_1(x''_I, y''_I) & g_2(x''_I, y''_I) & \cdots & g_J(x''_I, y''_I) \end{pmatrix},$$

$$A_2 = \begin{pmatrix} g_1^x(x''_1, y''_1) & g_2^x(x''_1, y''_1) & \cdots & g_J^x(x''_1, y''_1) \\ g_1^x(x''_2, y''_2) & g_2^x(x''_2, y''_2) & \cdots & g_J^x(x''_2, y''_2) \\ \vdots & \vdots & & \vdots \\ g_1^x(x''_I, y''_I) & g_2^x(x''_I, y''_I) & \cdots & g_J^x(x''_I, y''_I) \end{pmatrix},$$

$$A_3 = \begin{pmatrix} g_1^y(x''_1, y''_1) & g_2^y(x''_1, y''_1) & \cdots & g_J^y(x''_1, y''_1) \\ g_1^y(x''_2, y''_2) & g_2^y(x''_2, y''_2) & \cdots & g_J^y(x''_2, y''_2) \\ \vdots & \vdots & & \vdots \\ g_1^y(x''_I, y''_I) & g_2^y(x''_I, y''_I) & \cdots & g_J^y(x''_I, y''_I) \end{pmatrix};$$

step (S3353): obtaining an evaluation function, $$P = (A_1^T A_1 + w A_2^T A_2 + w A_3^T A_3)^{-1} \cdot (A_1^T Z + w A_2^T U + w A_3^T V),$$

wherein w is a weighting greater than 0;

step (S3354): selecting different weightings w and setting a gradient $\nabla f(P)$ of the evaluation function equal f(P) to 0, to obtain a plurality of different values of P and a plurality of freeform surface shapes z=f(x, y; P) corresponding to each of the plurality of different values of P; and step (S3355): choosing a final freeform surface shape $\Omega_{opt}$ which has a best imaging quality from the plurality of freeform surface shapes z=f(x, y; P).

Figure 3:
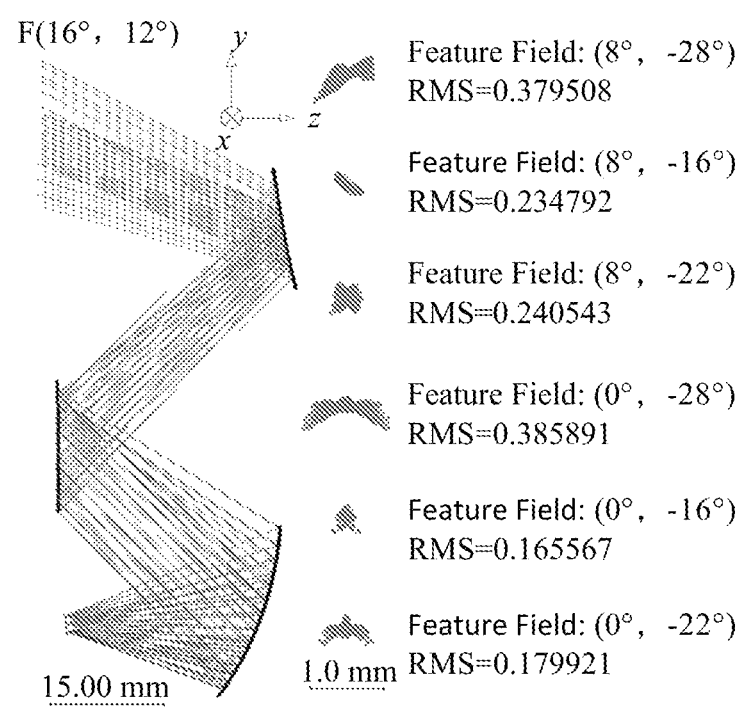
FIG. 3 shows a result of system construction using a first FOV in one embodiment.

It can be understood that the method of constructing the remaining initial surfaces $L_i$ (i=2 . . . L) into freeform surfaces is the same as the method of constructing the freeform surface $N_1$. According to the method of constructing freeform surfaces, each freeform surface is constructed in turn to obtain all freeform surfaces. In one embodiment, a result of constructing the initial system according to the first FOV [16°, 12°] is shown in FIG. 3.

Figure 4:
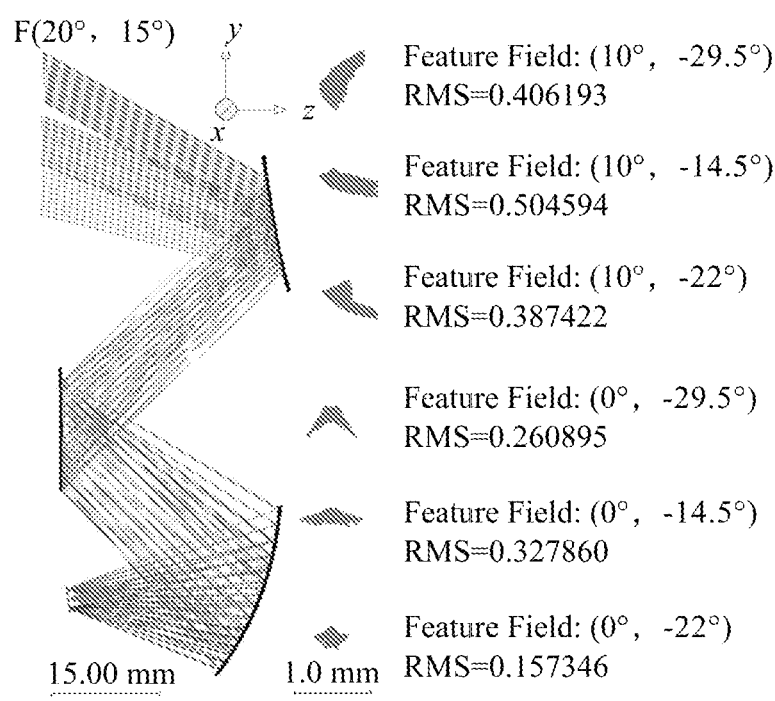
FIG. 4 shows a result of system construction using a second FOV in one embodiment.

In the step (S4), the system constructed in the step (S4) is set as a new initial system for a next system construction in the second FOV $X_2 \times Y_2$. The method for constructing the next system comprises steps of: selecting K feature rays in the second FOV $X_2 \times Y_2$; obtaining a plurality of intersection points of the K feature rays and a freeform surface to be constructed based on the object-image relationships and the law of reflections, and calculating a plurality of feature data points on the freeform surface to be constructed; surface fitting the plurality of feature data points to obtain an equation of the freeform surface. Wherein the methods for selecting K feature rays, calculating the plurality of feature data points and surface fitting are the same as the methods in the step (S3). In one embodiment, the freeform surface constructed under the first FOV [16°, 12°] is set as an initial system for system construction in the second FOV [20°, 15°], and the results is shown as FIG. 4.

Figure 5:
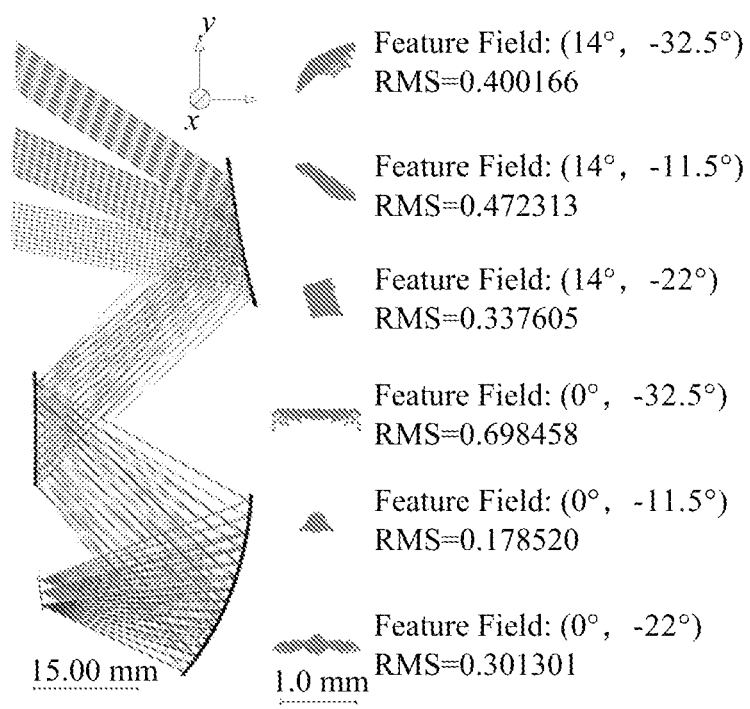
FIG. 5 shows a result of system construction using a forth FOV in one embodiment.
Figure 6:
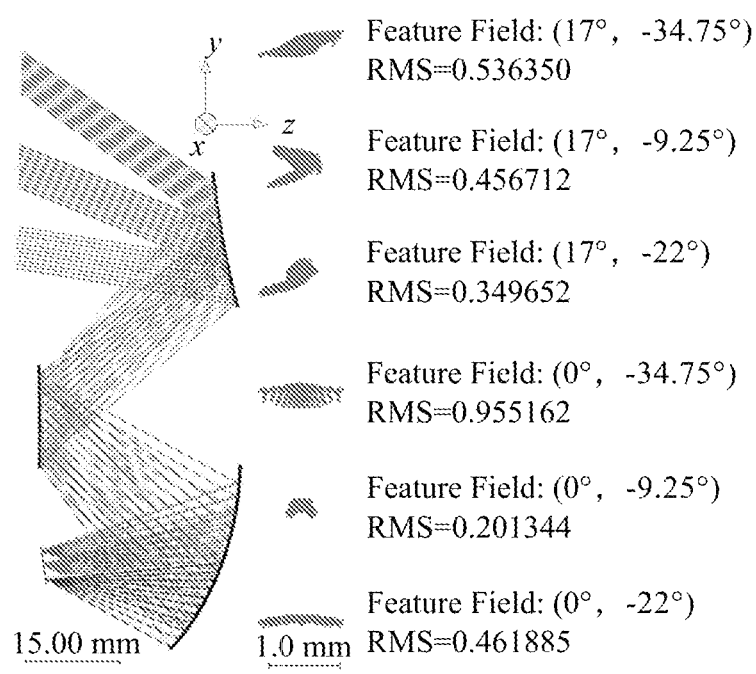
FIG. 6 shows a result of system construction using a sixth FOV in one embodiment.
Figure 7:
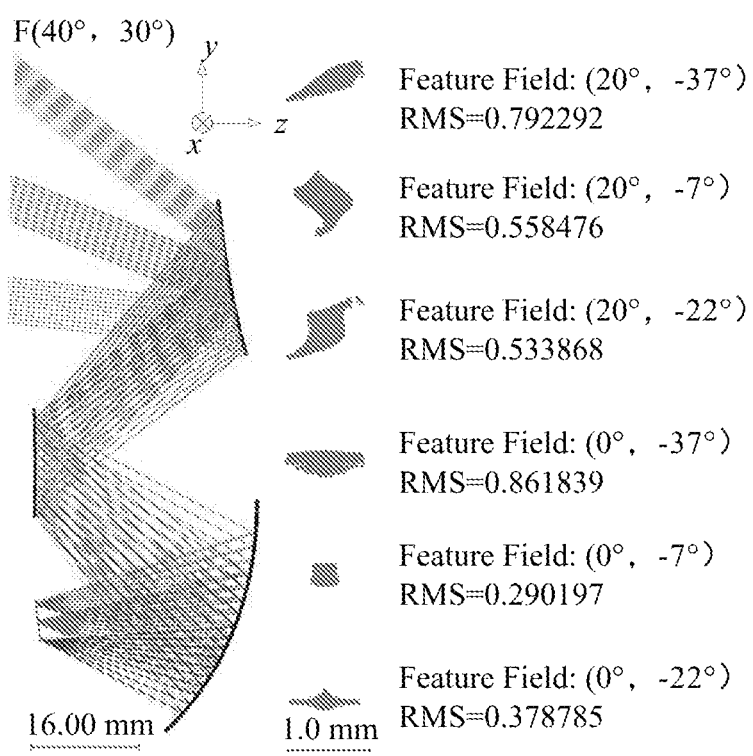
FIG. 7 shows a final result of system construction using a ninth FOV in one embodiment.

In the step (S5), the freeform surface system constructed in the second FOV $X_2 \times Y_2$ is set as the initial system to reconstruct all freeform surfaces of the system based on the third FOV $X_3 \times Y_3$. Then, the freeform surface system constructed in the third FOV $X_3 \times Y_3$ is set as the initial system to reconstruct all freeform surfaces of the system based on the fourth FOV $X_4 \times Y_4$. By analogy, a size of the FOV is gradually increased according to the field sequence selected in the step (S5). At the same time, the system obtained in the last step is used as the initial system for system construction until the FOV $X_n \times Y_n$ is reached. Finally, in the nth FOV $X_n \times Y_n$, the freeform surface system constructed in the (n−1)th FOV $X_{n-1} \times Y_{n-1}$ is used as the initial system, and all free-form surfaces in the system are reconstructed to obtain the freeform surface reflective imaging system with a low F-number and a large rectangular FOV. In one embodiment, the results of system construction based on the fourth FOV [28°, 21°] and the sixth FOV [34°, 25.5°] are shown in FIG. 5 and FIG. 6, respectively. The final result of system construction based on the ninth FOV [40°, 30°] is shown in FIG. 7. The F-number of the final system is 1.39 and the FOV of the final system reaches 40°×30°. The final system can meet performance requirements and have imaging performance; thus it can be used as an initial structure for subsequent optimization.

Furthermore, a step of optimizing the freeform surface reflective system obtained in step (S5) by using the freeform surface reflective system as a starting point of optimization can be performed.

In the present disclosure, an exiting imaging system with a low F-number and a small FOV is selected as the initial system. Then, the FOV of the imaging system is gradually expanded with equal steps or unequal steps, while the imaging system is constructed using point-by-point methods. Finally, after multiple constructions, a freeform surface reflective imaging system with a small F-number and a large rectangular FOV is obtained.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A method for designing a freeform surface reflective imaging system, comprising:
   (i) selecting an initial system, wherein an FOV of the initial system is $X_0 \times Y_0$;
   (ii) selecting the FOV sequence as $[X_0, Y_0], [X_1, Y_1], [X_2, Y_2], \ldots [X_n, Y_n]$, while the FOV of the system to be designed is $X_n \times Y_n$, and $X_0 < X_1 < X_2 < \ldots < X_n$, $Y_0 < Y_1 < Y_2 < \ldots < Y_n$;
   (iii) using point-by-point methods to construct all freeform surfaces of the initial system in the FOV of $X_1 \times Y_1$;
   (iv) setting the system obtained in step (iii) as a second initial system for system construction in the FOV of $X_2 \times Y_2$; and
   (v) repeating step (iv) to execute system construction in the order of the FOV sequence until the final FOV $X_n \times Y_n$ is obtained.

2. The method of claim 1, wherein the initial system is a freeform surface system and comprises a plurality of freeform surfaces.

3. The method of claim 1, wherein the FOV sequence is selected by using an equal step length.

4. The method of claim 3, wherein the differences between adjacent values in $X_0, X_1, X_2, \ldots, X_n$ are equal, and the differences between adjacent values in $Y_0, Y_1, Y_2, \ldots, Y_n$ are equal.

5. The method of claim 1, wherein the FOV sequence is selected by using an unequal step length with a step length during the first few constructions larger than that when approaching the final FOV.

6. The method of claim 3, wherein the initial system comprises L initial surfaces, and the L initial surfaces are defined as $L_j$ (j=1, 2, . . . L), and the initial freeform surface $L_j$ (j=i=1, 2 . . . L) is constructed sequentially into freeform surface $N_j$ (j=i=1, 2 . . . L) using the point-by-point method.

7. The method of claim 6, wherein constructing the initial freeform surface $L_1$ into the freeform surface $N_1$ comprises:
   selecting K feature rays $R_i$ (i=1, 2 . . . K);
   obtaining a plurality of intersection points of the K feature rays and the freeform surface $N_1$ based on the object-image relationships and the law of reflections, and calculating a plurality of feature data points $P_i$ (i=1, 2 . . . K) on the freeform surface $N_1$; and
   surface fitting the plurality of feature data points to obtain an equation of the freeform surface $N_1$.

8. The method of claim 7, wherein the step of selecting K feature rays comprises selecting M feature fields within the FOV of $X_1 \times Y_1$; and selecting K feature rays in the M feature fields.

9. The method of claim 8, wherein if a center FOV of the initial system is $(0, y_0)$, the feature fields are selected in the following manner:

$$\left\{(0, y_0), \left(0, y_0 + \frac{Y_1}{2}\right), \left(0, y_0 - \frac{Y_1}{2}\right), \left(\frac{X_1}{2}, y_0\right), \left(\frac{X_1}{2}, y_0 + \frac{Y_1}{2}\right), \left(\frac{X_1}{2}, y_0 - \frac{Y_1}{2}\right)\right\}.$$

10. The method of claim 8, wherein the step of selecting the K feature rays in the M feature fields comprises: an aperture of each of the M feature fields is divided into N equal parts; and, P feature rays at different aperture positions in each of the N equal parts are selected; as such, K=M×N×P different feature rays correspond to different aperture positions and different fields are selected.

11. The method of claim 7, wherein the step of calculating a plurality of feature data points $P_i$ (i=1, 2 . . . K) on the freeform surface $N_1$ further comprises:
 (a) defining a first intersection of a first feature ray $R_1$ and the freeform surface $N_1$ as a feature data point $P_1$;
 (b) when i (1≤i≤K−1) first feature data points $P_i$ (1≤i≤K−1) have been obtained, a unit normal vector $\vec{N}_i$ (1≤i≤K−1) at each of the i (1≤i≤K−1) first feature data points $P_i$ (1≤i≤K−1) can be calculated based on a vector form of Snell's Law;
 (c) making a first tangent plane at the i (1≤i≤K−1) first feature data points $P_i$ (1≤i≤K−1) respectively; thus i first tangent planes are obtained, and i×(K−i) second intersections are obtained by the i first tangent planes intersecting with remaining (K−i) feature rays; and a second intersection, which is nearest to the i (1≤i≤K−1) first feature data points $P_i$, is fixed from the i×(K−i) second intersections as a next feature data point $P_{i+1}$ (1≤i≤K−1); and
 (d) repeating steps (b) and (c), until all the plurality of first feature data points $P_i$ (i=1, 2 . . . K) are calculated.

12. The method of claim 7, wherein the step of calculating a plurality of feature data points $P_i$ (i=1, 2 . . . K) on the freeform surface $N_1$ further comprises:
 (a') defining a first intersection of a first feature light ray $R_1$ and the initial surface as a feature data point $P_1$;
 (b') when an ith (1≤i≤K−1) feature data point $P_i$ (1≤i≤K−1) has been obtained, a unit normal vector $\vec{N}_i$ at the ith (1≤i≤K−1) feature data point $P_i$ (1≤i≤K−1) is calculated based on the vector form of Snell's law;
 (c') making a first tangent plane through the ith (1≤i≤K−1) feature data point $P_i$ (1≤i≤K−1), and (K−i) second intersections are obtained by the first tangent plane intersecting with remaining (K−i) feature rays; a second intersection $Q_{i+1}$, which is nearest to the ith (1≤i≤K−1) feature data point $P_i$ (1≤i≤K−1), is fixed; and a feature ray corresponding to the second intersection $Q_{i+1}$ is defined as $R_{i+1}$, a shortest distance between the second intersection $Q_{i+1}$ and the ith feature data point $P_i$ (1≤i≤K−1) is defined as $d_i$;
 (d') making a second tangent plane at (i−1) feature data points that are obtained before the ith feature data point $P_i$ (1≤i≤K−1) respectively; thus, (i−1) second tangent planes are obtained, and (i−1) third intersections are obtained by the (i−1) second tangent planes intersecting with a feature ray $R_{i+1}$; in each of the (i−1) second tangent planes, each of the (i−1) third intersections and its corresponding feature data point form an intersection pair; the intersection pair, which has the shortest distance between a third intersection and its corresponding feature data point, is fixed; and the third intersection and the shortest distance is defined as $Q'_{i+1}$ and $d'_i$ respectively;
 (e') comparing $d_i$ and $d'_i$, if $d_i \leq d'_i$, $Q_{i+1}$ is taken as the next feature data point $P_{i+1}$ (1≤i≤K−1); otherwise, $Q'_{i+1}$ is taken as the next feature data point $P_{i+1}$ (1≤i≤K−1); and
 (f') repeating steps from (b') to (e'), until the plurality of feature data points $P_i$ (i=1, 2 . . . K) are all calculated.

13. The method of claim 7, wherein the step of surface fitting the plurality of first feature data points $P_i$ (i=1, 2 . . . K) comprises:
 surface fitting the plurality of first feature data points $P_i$ (i=1, 2 . . . K) to a sphere in the first three-dimensional rectangular coordinates system, and obtaining a curvature c of the sphere and the center of curvature ($x_c$, $y_c$, $z_c$) corresponding to the curvature c of the sphere;
 defining the feature data point ($x_o$, $y_o$, $z_o$) corresponding to a chief ray of the central field angle among the entire field-of-view (FOV) as the vertex of the sphere, defining a second three-dimensional rectangular coordinates system by the vertex of the sphere as origin and a line passing through the center of curvature and the vertex of the sphere as a Z'-axis;
 transforming the coordinates ($x_i$, $y_i$, $z_i$) and the normal vector ($\alpha_i$, $\beta_i$, $\gamma_i$), of the plurality of first feature data points $P_i$ (i=1, 2 . . . K) in the first three-dimensional rectangular coordinates system, into the coordinates ($x'_i$, $y'_i$, $z'_i$) and the normal vector ($\alpha'_i$, $\beta'_i$, $\gamma'_i$), of the plurality of first feature data points $P_i$ (i=1, 2 . . . K) in the second three-dimensional rectangular coordinates system;
 fitting the plurality of first feature data points $P_i$ (i=1, 2 . . . K) into a conic surface equation of a conic surface in the second three-dimensional rectangular coordinates system, based on the coordinates ($x'_i$, $y'_i$, $z'_i$) and the curvature c of the sphere, and obtaining the conic constant k; and
 removing the coordinates and the normal vector of the plurality of first feature data points $P_i$ (i=1, 2 . . . K), on the conic surface in the second three-dimensional rectangular coordinates system, from the coordinates ($x'_i$, $y'_i$, $z'_i$) and the normal vector ($\alpha'_i$, $\beta'_i$, $\gamma'_i$), to obtain a residual coordinate and a residual normal vector; and fitting the residual coordinate and the residual normal vector to obtain a polynomial surface equation; the equation of the first freeform surface is obtained by adding the conic surface equation and the polynomial surface equation.

\* \* \* \* \*